United States Patent [19]
Berg et al.

[11] Patent Number: 6,102,992
[45] Date of Patent: Aug. 15, 2000

[54] METHOD AND APPARATUS FOR ENCAPSULATING PARTICULATES

[75] Inventors: Robert O. Berg, Paso Robles, Calif.; William F. Rigby; John P. Albers, both of Richland, Wash.

[73] Assignee: Encapsulation Technology, LLC, Los Angeles, Calif.

[21] Appl. No.: 09/191,496

[22] Filed: Nov. 13, 1998

Related U.S. Application Data

[62] Division of application No. 08/706,217, Aug. 30, 1996, Pat. No. 5,878,355.

[60] Provisional application No. 60/003,106, Sep. 1, 1995, abandoned.

[51] Int. Cl.$^7$ ...................................................... B01F 3/04
[52] U.S. Cl. ................................ 96/361; 261/29; 261/81; 261/DIG. 48
[58] Field of Search ............................... 261/29, 30, 36.1, 261/81, DIG. 48, DIG. 65; 96/361, 363, 364

[56] References Cited

U.S. PATENT DOCUMENTS

| | | | |
|---|---|---|---|
| 2,070,578 | 2/1937 | Bowman | 261/121 |
| 2,663,382 | 12/1953 | Dautrebande | 183/121 |
| 2,807,504 | 9/1957 | Bloxsom | 299/88.5 |
| 3,465,504 | 9/1969 | Oropeza et al. | 96/361 |
| 3,749,377 | 7/1973 | Slater et al. | 261/78.1 |
| 3,885,918 | 5/1975 | Isahaya | 23/284 |
| 3,892,543 | 7/1975 | Margraf . | |
| 3,901,443 | 8/1975 | Mitsui et al. | 239/102 |
| 3,911,684 | 10/1975 | Busey | 60/644 |
| 4,526,808 | 7/1985 | Strohmaier | 427/57 |
| 4,579,569 | 4/1986 | Sheng et al. | 96/361 |
| 5,084,217 | 1/1992 | Dodds | 261/36.1 |
| 5,464,458 | 11/1995 | Yamamoto | 96/361 |
| 5,779,804 | 7/1998 | Mikoshiba et al. | 261/81 |

FOREIGN PATENT DOCUMENTS

| | | | |
|---|---|---|---|
| 4318885 | 6/1994 | Germany . | |
| 4-63169 | 2/1992 | Japan . | |
| 581308 | 11/1977 | U.S.S.R. | 261/81 |

OTHER PUBLICATIONS

Webster's II New Riverside University Dictionary (Excerpts), no date.

Japanese Patent Abstract, Publication No. JP 60 181176 A (Kashiwa K.K.), Publication Date Feb. 4, 1986, vol. 010, No. 028 (C–326).

*Primary Examiner*—C. Scott Bushey
*Attorney, Agent, or Firm*—Christie, Parker & Hale, LLP

[57] ABSTRACT

An improved method and device for decontamination of a contaminated process area is provided whereby a fine aerosol of an encapsulant for use in encapsulating the contaminants within the contaminated environment is generated. The aerosol is generated by a plurality of ultrasonic transducers located below the surface of a reservoir containing a capture liquid. The output of the transducers is focused to a point near the surface of the liquid to cause a surface disturbance which results in the formation of an aerosol of encapsulant from the capture liquid. A pressurization fan is used to force ambient air through the pressurization chamber to transport the aerosol to the process area to be treated. The aerosol forms a thin coating of encapsulant over the hazardous material thereby allowing the hazardous material to be safely removed from the process area or permanently adhered to the walls of the process area. If a chemically hazardous material is found in the process area, a capture liquid can be selected to neutralize the hazardous material. The process is especially effective at recovering radioactive dust from a contaminated process area.

15 Claims, 3 Drawing Sheets

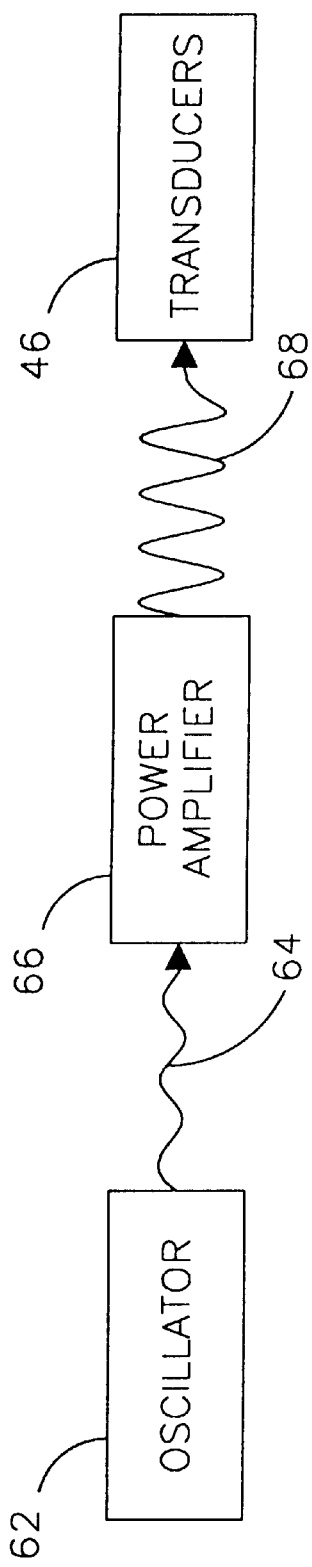
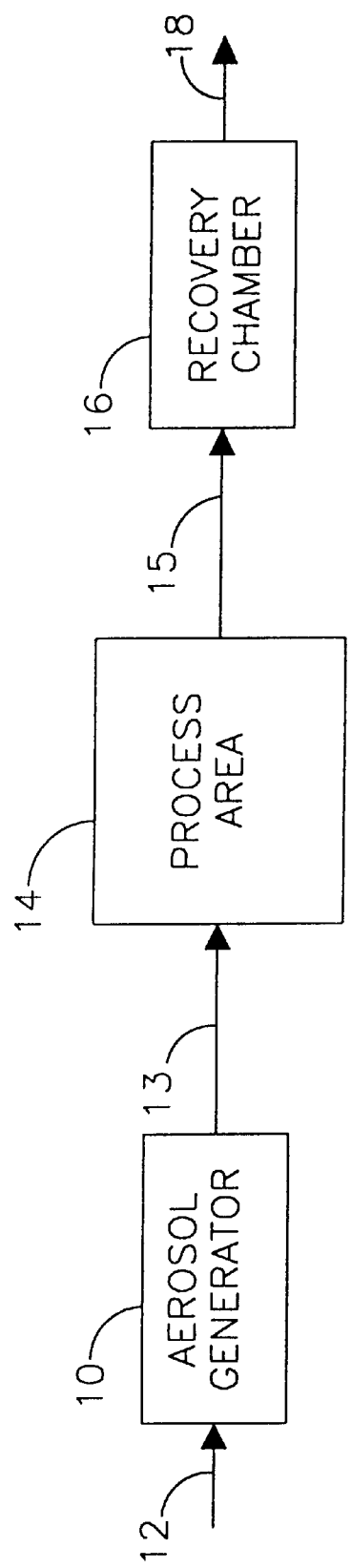

ып6,102,992

METHOD AND APPARATUS FOR ENCAPSULATING PARTICULATES

CROSS REFERENCE TO RELATED APPLICATION

This application is a divisional of patent application Ser. No. 08/706,217; filed Aug. 30, 1996, now U.S. Pat. No. 5,878,355, which claims priority to provisional Application No. 60/003,106; filed Sep. 1, 1995, abandoned both of which are hereby incorporated by reference.

FIELD OF THE INVENTION

This invention relates to a method and apparatus for the encapsulation of hazardous materials found as particulates so as to prevent the particulates from becoming airborne. More particularly, it relates to the generation of an aerosol for use in the decontamination of an enclosed space by using the aerosol to encapsulate contaminants such as hazardous dust found in the enclosed space. By encapsulating the contaminants with a capture coating, the encapsulated particles can be either left in place or safely removed so as to eliminate the risk of resuspension of the contaminants.

BACKGROUND OF THE INVENTION

The decontamination of certain contaminated environments has proven to be especially problematic. In particular, where contamination levels or physical configuration of the environment make conventional access impractical, removal of those dust particles can be difficult. For example, in nuclear laboratories and the nuclear power and nuclear weapons manufacturing industries, the generation of radioactive dust has led to severe contamination problems. Often entire rooms or systems of ventilation equipment including ducts contaminated with radioactive dust have had to be sealed because no practical method of decontamination was known. In some instances, entire buildings have been sealed and condemned in place because contamination prevents the destruction of the building. Once an environment has been sealed, the particles tend to fall out of the atmosphere and deposit on the surfaces of the floors and walls of the closed environment. However, the slightest disturbance of the atmosphere of the closed environment can result in resuspension of the particulates which will tend to float freely within the atmosphere. Conventional contamination control methods have been unable to effectively control such contaminants. Such a result is often unacceptable, especially if the particulates contain a highly hazardous radioactive material such as plutonium.

Attempts to decontaminate, maintain, and even enter many of these types of areas have resulted in the resuspension of the contaminants. This resuspension can lead to an airborne hazard for humans, resulting in an uptake of the hazardous material.

SUMMARY OF THE INVENTION

According to the present invention, a device and method for encapsulating hazardous particulates found within a process area are disclosed. The particulates are encapsulated by forming an aerosol of a capture liquid which is introduced to the process area. The aerosol encapsulates the particulates and adheres them to the surfaces of the process area. The individual droplets that form the aerosol are of a defined size distribution and can be produced without significant turbulence. The device does not use heat to form the aerosol and, therefore, avoids any undesirable separation or thermal breakdown of the chemical constituents that are to be formed into the aerosol. The aerosol generated is passive in nature making it effective in process areas where turbulence is to be avoided. The device can be used with a broad range of liquids without the undesirable effects of other aerosol generators.

It is important to recognize that an aerosol is defined as a suspension of tiny droplets of liquid. In many ways, an aerosol can be made to behave like a gas. For example, it can be made to flow from areas of high concentration to areas of low concentration. It can also be used to fill an enclosed space like a gas. Nonetheless, the individual droplets that form the aerosol retain the chemical properties of a liquid. Therefore, the individual droplets that form an aerosol are technically already condensed as tiny droplets of liquid. However, the use of the term "condense" herein is generally meant to refer to the agglomeration of enough aerosol droplets to form large droplets that can no longer behave in the gas-like fashion of a true aerosol.

Process areas where this invention could prove useful are ventilation ducts, process glove boxes, "infinity" rooms, air locks, process piping, process vessel internals, destruction work areas and large area hot cells. It can also be useful for long-term mothballing of industrial or manufacturing facilities. Chemically reactive aerosols can also be useful in neutralizing process areas such as fume hoods or areas of chemical spills.

By encapsulating hazardous material with the device and method of the present invention, the possibility of an airborne hazard to humans can be reduced or even eliminated. Consequently, the device and method can make it possible for humans to work on or work in contaminated areas which were previously inaccessible due to the airborne hazard.

The device is especially useful for decontamination of process areas contaminated with hazardous particulate matter such as plutonium contamination or other radioactive dust. A polymeric coating material or capture liquid can be formed into an aerosol by the device and method of the present invention. The aerosol can then be introduced into the process area such as through existing ventilation ducts to create a fog which passively fills the enclosed space without generating significant turbulence. The capture liquid is selected so as to form a layer of encapsulant over the exposed surfaces of the process area, thereby encapsulating the hazardous dust. Once the dust is so encapsulated, it can be further treated in various ways. For example, it can be collected along with the encapsulant for proper disposal. As an alternative, a second layer of more durable material can be applied over the first layer before removal. The initial capture liquid may also be selected so as to form a permanent coating over the hazardous material so that it can be permanently encapsulated in place.

The device includes a primary reservoir for containing the capture liquid. Submerged below the surface of the liquid within the reservoir are one or more piezoelectric transducers for generating ultrasonic waves focused to a point near the surface of the liquid. Preferably six transducers are used in parallel. The focused ultrasonic waves created by the transducers cause a disturbance at the liquid surface which, in turn, causes tiny droplets of the liquid to shear off and form the aerosol.

The liquid level of the primary reservoir is maintained by an overflow weir. By maintaining the liquid level constant, the transducers are kept in focus as the liquid is driven off. The liquid spills over the overflow weir into an overflow reservoir located below the primary reservoir. A recirculation pump is used to transfer the overflowing liquid back from the overflow reservoir to the primary reservoir and thereby maintain the liquid level constant.

The reservoirs are enclosed within a pressurization chamber with inlet and outlet ports. A fan at the inlet port supplies ambient air into the pressurization chamber in order to create a slight positive pressure in the pressurization chamber. This air is used to carry the aerosol from the pressurization chamber through the outlet port where the aerosol can be directed into the process area which is to be encapsulated. One advantage of such a device is that the equipment used can be placed outside the process area to minimize disturbances within the process area.

Once the process area has been filled with a fog of the encapsulating aerosol, a steady state condition can be maintained by withdrawing an exhaust stream portion of the atmosphere from the process area for treatment in a recovery chamber while continuing to direct aerosol into the process area. An exhaust fan draws the exhaust stream from the process area into the recovery chamber. A spray of liquid such as distilled water is used in the recovery chamber for condensing the aerosol. The liquid spray system also includes a sump for collecting the spray and a recycle pump so that the spray can be reused. The exhaust stream then passes through a moisture separator for further removal of moisture from the exhaust stream. From the moisture separator, the exhaust stream is directed through a high-efficiency particulate air filter for providing the final process filtration step to the exhaust stream. A fully filtered exhaust stream can then be released into the atmosphere or directed to further treatment facilities.

By measuring the amount of aerosol removed from the process area and calculating the amount of aerosol added to the process area, the total amount of aerosol deposited on the surfaces of the process area can be estimated. Once the desired amount of aerosol has been deposited on the surfaces, the aerosol generator can be shut down and the recovery system used to recover the remaining airborne aerosol from the process area.

Upon contact with the surfaces of the process area, the aerosol forms a thin film which encapsulates the hazardous material. Preferably the aerosol is formed from a capture liquid that coalesces upon contact with the surfaces so as to form a tacky or sticky coating over the hazardous material. While it is preferred that the aerosol be introduced passively into the process area, that is, with little or no turbulence, by using a tacky capture liquid, even if some of the particulates are disturbed and resuspended, they will either tend to settle onto the tacky surfaces of the thin film for encapsulation, or will become encapsulated while airborne and then settle onto the tacky surfaces of the process area.

Once the aerosol treatment has been completed, various clean up methods can be employed. For example, workers wearing the appropriate protective gear can enter the enclosed environment and either collect the encapsulated hazardous material from the surfaces of the enclosed environment or perhaps apply a second, more durable coat of encapsulant. In some instances, the process area can be entered without the need for respiration or other protective equipment as the process virtually eliminates the hazard of inhalation exposure. So as to avoid human entry into the process area, robots may also be used to scrape or otherwise remove the hazardous material from the surfaces.

In some process areas, such as those contaminated with asbestos dust, a more permanent coating can be applied which need not be removed. Either the initial capture liquid can be selected to form a permanent coat, or a second coat can be applied with the aerosol generator to permanently encapsulate the contaminants. In such instances, the coating of the exposed surfaces effectively eliminates the hazard without the need for removal or further treatment.

BRIEF DESCRIPTION OF THE DRAWINGS

The process and device for decontamination of process areas contaminated with hazardous particulates or dust are best understood with reference to the following detailed description of the invention and drawings in which:

FIG. 1 is a block flow diagram illustrating the method and apparatus for decontamination of a process area;

FIG. 3 is a block diagram illustrating the electronics used in generating the ultrasonic signals used in the present inventions.

DETAILED DESCRIPTION OF THE INVENTION

Figure 2:
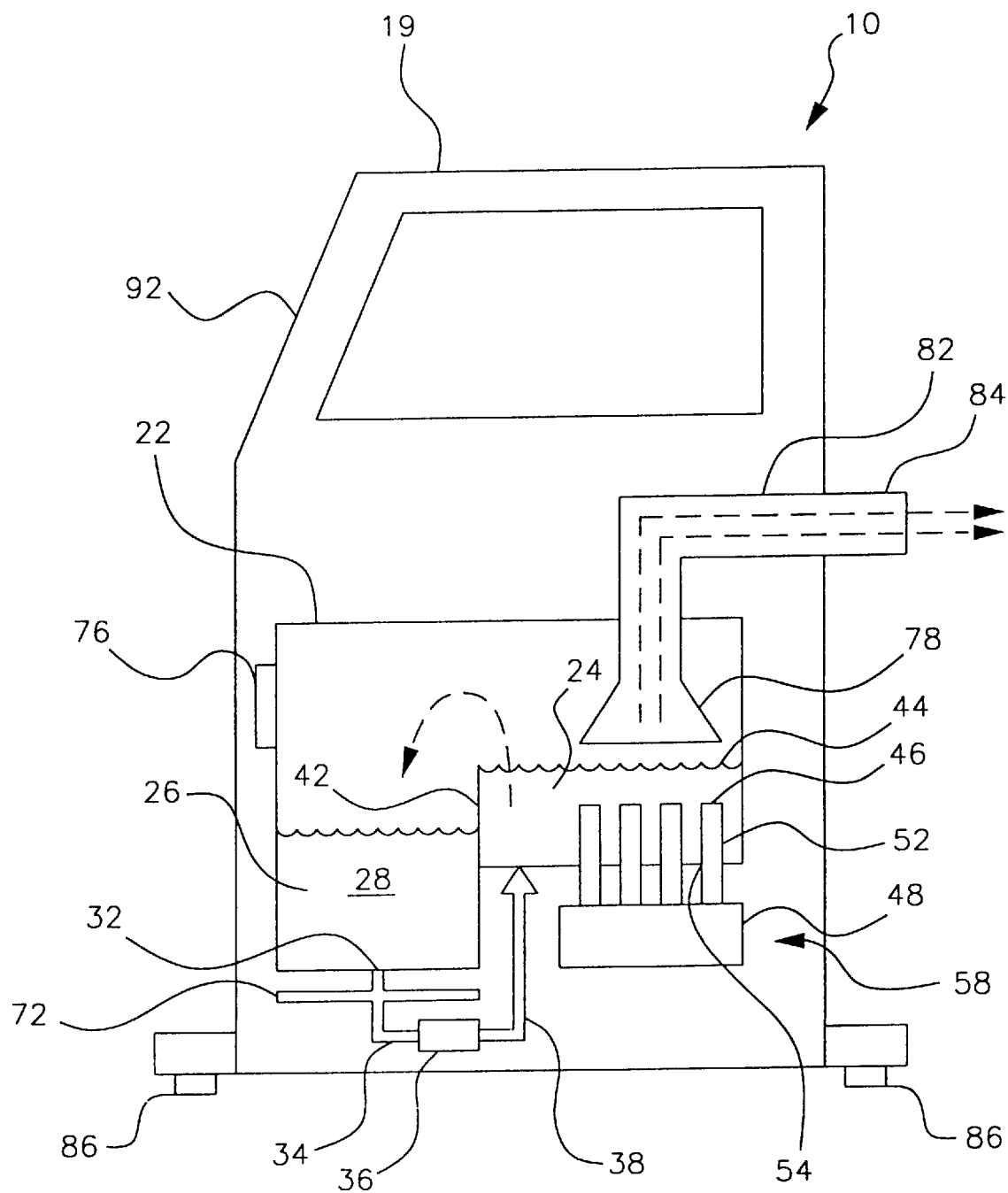
FIG. 2 is a partly schematic elevation view of an aerosol generator according to the present invention.

The process and device of the present invention includes two key components: an aerosol generator and an aerosol recovery chamber. As illustrated in the block flow diagram of FIG. 1, the aerosol generator 10 is used to produce an aerosol of a capture liquid such as a polymeric encapsulant which is carried by ambient air 12. An aerosol stream 13 is generated and used to fill an enclosed environment such as a process area 14 in order to capture any hazardous dust that may be present in the process area. Once the process area has been suitably filled with aerosol, a portion of the aerosol can optionally be purged by removing an exhaust aerosol stream from the process area for recovery of the aerosol in an aerosol recovery chamber 16 while continuing to add aerosol to the process area. The aerosol recovery chamber is used to capture the aerosol and any other airborne contaminants before the exhaust air 18 is released to atmosphere.

The use of such equipment is especially useful for decontamination of a hazardous dust-laden atmosphere. For example, in the nuclear power, and the nuclear weapons manufacturing industries and in nuclear laboratories, process areas have been known to become contaminated with radioactive dust. By creating an aerosol of a capture liquid, the dust can be encapsulated within a film of a coating material which is formed on the exposed surfaces of the process area. Once the hazardous dust has been so encapsulated by the film, the hazardous material can be removed from the surfaces along with the coating material and disposed of properly.

This method is also useful for collection of other hazardous dusts including lead dust, asbestos dust and beryllium dust. Moreover, it can be useful for the neutralization of chemical hazards which may be present in the form of airborne droplets, vapor or particulates as well as chemical hazards that exist as surface contamination.

Many different liquids can be used for the capture liquid. For radioactive dust, the liquid should be selected to aid in managing the dust, and perhaps to allow personnel to enter the contaminated area. However, it generally cannot be used to neutralize the hazard. A tacky capture liquid such as a water-based urethane suspended in a two-part organic solution works well. The encapsulant formed by such a capture liquid stays somewhat tacky, even after it has coalesced on the surfaces of the process area. This allows any residual or airborne contaminates to adhere to the layer of encapsulant.

When treating a process area contaminated with radioactive dust, it is also preferred that the capture liquid be selected so as to avoid creation of a mixed waste. If a chemically hazardous material is used for the capture liquid, the encapsulated radioactive dust would be classified as a mixed waste as it would be both chemically and radioactively hazardous. The disposal of mixed waste is very difficult as most hazardous waste facilities are designed for the handling of only one, but not both types of waste.

Depending on the amount and type of radioactive material to be encapsulated, criticality concerns can arise by the encapsulation of the radioactive material. Moreover, the addition of an encapsulant containing hydrogen can increase criticality concerns as hydrogen is known to increase the reactivity of nuclear material by moderating or reducing the energy level of the neutrons emitted. By proper selection of the type and amount of the capture liquid, such criticality concerns can be mitigated. Moreover, by adding a suitable neutron poison such as boron, a neutral, or even a negative reactivity coefficient can be achieved for a particular capture liquid.

For many hazardous dusts such as asbestos dust or lead dust, the encapsulation of the particulates can often render them harmless. For treating a process area contaminated with these particulates, an encapsulant that hardens into a durable, permanent layer may be preferred. In the alternative, a tacky encapsulant may first be used to capture all the particulates including the airborne particulates. Then, a more permanent and harder outer coating can be applied over the tacky coating. Either the aerosol generator or conventional spray techniques can be used to provide this outer coating.

One example where such a method of permanently encapsulating hazardous particulates might be particularly useful is in the treatment of ventilation ducts contaminated with asbestos fibers. By permanently encapsulating the fibers against the walls of the ducts so as to prevent them from becoming airborne, the risk of asbestos exposure can be mitigated while allowing the continued use of the ducts. A periodic treatment of the ducts with added layers of coating material at established intervals will ensure that the fibers are prevented from breaking loose.

Such a permanent encapsulation method can also be useful in permanently mothballing a process area containing radioactive or other hazardous dust. Periodic recoating can also be useful where the contaminated particulates are susceptible to atomic recoil.

If a process area is contaminated by chemically reactive vapors or particulates, the aerosol generator can be used with an appropriate neutralizing agent and/or buffers to chemically neutralize the hazard. Such a procedure can be useful in process piping where the piping is unable to withstand the hydrostatic pressure that would be realized if a method of liquid treatment were undertaken. As just one example, an acidic process system can be effectively neutralized through the generation of a caustic aerosol.

It can also be useful in some instances to add a pigment or dye to the capture liquid. By adding color to the capture liquid, a simple visual inspection of the surfaces of the process area can be used to confirm that an even layer of encapsulant has been applied.

It should also be recognized that very simple chemical compositions can be quite effective at encapsulating hazardous dust. For example, a balanced mixture of monosaccharides and polysaccharides dissolved in deionized water can be produced into an aerosol for effectively capturing hazardous dust. The inherent stickiness of such a solution adds to its effectiveness.

As pointed out, many different materials can be used for forming the aerosol depending upon the type of hazard to be removed from the process area. While solvent based solutions will often work well, water based solutions are generally preferred so as to avoid the possibility of creating an explosive atmosphere within the process area. Since the process area to be treated generally includes air, suitable capture liquids include those that will oxidize in air to encapsulate the particulates.

The aerosol is formed by an aerosol generator as illustrated in FIG. 2. The aerosol generator includes a cabinet 19 containing a pressurization chamber 22 in which the aerosol is produced. Preferably the pressurization chamber is a stainless steel tank. By providing a stainless steel pressurization chamber that is generally resistant to chemical attack, many different chemical materials can be used with a single generator for forming the aerosol.

Within the pressurization chamber are two internal liquid reservoirs, a primary reservoir 24 and an overflow reservoir 26. The capture liquid 28 to be formed into an aerosol is placed in the overflow reservoir. The use of a fill tube will simplify the addition of liquid. The liquid in the overflow reservoir flows into a sump 32 where it is drawn to a suction tube 34 for a capture liquid recirculation pump 36. The recirculation pump circulates the liquid through a recirculation tube 38 up to the primary reservoir. The total liquid capacity of the combined reservoirs is about three gallons with about one gallon in the primary reservoir and about two gallons in the overflow reservoir.

The suction and recirculation tubes are preferably provided as a single, continuous, flexible tube. The recirculation pump is preferably a peristaltic pump that recirculates the liquid within the tubing by acting on the external walls of the tubing. Such pumps are well known in the medical device industry. Such pumps are powered by variable speed d.c. motors that allow the recirculation rate to be varied between about 1 and 20 ml per minute. A peristaltic pump is preferred as it does not come in direct contact with the liquid. This makes cleaning the aerosol generator easier and eliminates the possibility that the capture liquid may be incompatible with the pump or that leakage of lubricants from the pump could contaminate the capture liquid. In the preferred embodiment, the tubing is also disposable to further simplify cleaning. The use of an inexpensive, disposable pump is also contemplated so as to avoid the expense of a peristaltic pump.

Between the primary and overflow reservoir is an overflow weir 42 which maintains the capture liquid level 44 in the primary reservoir at a constant level. Once the level of the capture liquid in the primary reservoir reaches the height of the overflow weir, excess liquid spills over the weir and into the overflow reservoir.

Under the surface of the capture liquid in the primary reservoir are a plurality of piezoelectric ultrasonic transducers 46. Preferably six transducers are placed within the reservoir at the vertices of a normal hexagon. The six transducers are arranged to point upward towards the surface of the liquid in the primary reservoir. The depth of each transducer is adjusted to focus its output to a point near the surface of the liquid. Each transducer is of a cup shape that helps to focus the output signal to a point. Each of the six transducers is preferably fastened to a mounting plate 48 by a stainless steel mounting tube 52 so that all of the transducers can be moved up or down within the primary reservoir as a unit.

In the preferred embodiment, transducers made from lead-zirconite-titanite-four are used. This material yields high power drive transmission characteristics which are ideally suited to high driving fields. The transducers are approximately one inch in diameter and focus at approximately one inch in demineralized water. The precise focus can vary based on a number of factors which will be addressed in further detail later. The transducers are mounted to the stainless steel mounting tubes by a conductive O-ring which provides the ground contact. Nickel electrodes are used for the power supply. Such preferred transducers have a resonance frequency of about 2300 kilohertz. In order to avoid interference between the signals of the six transducers, they should be separated from one another by about 2 to 2½ inches. By mounting the six transducers on the apexes of a normal hexagon with 2½ inch sides, interference effects are negligible.

The mounting plate is located below the primary reservoir. Each of the six mounting tubes extends through an orifice 54 at the bottom of the primary reservoir. The orifices include seals so that the height of the transducers can be adjusted up or down by sliding the mounting tubes up or down through the bottom of the primary reservoir without the capture liquid leaking. The efficiency of the transducers is improved by having the inside of the mounting tubes exposed to air rather than liquid as this causes the transducers to focus their output toward the denser capture liquid rather than back through the air of the mounting tubes.

A transducer level adjusting assembly 58 is used to adjust the height of the mounting plate to thereby adjust the level of the transducers within the primary reservoir. The adjusting assembly preferably includes three threaded drive heads, three threaded drive posts, and a belt that turns the three drive heads simultaneously. A drive knob with a drive pulley is used to turn the belt. By turning the belt, the transducer mounting plate can be raised or lowered as necessary to simultaneously change the position of all of the transducers relative to the surface of the liquid in the primary reservoir.

The electronic equipment used for driving the transducers is best illustrated in FIG. 3. A variable frequency oscillator 62 is used to generate a high frequency sine wave 64. A preferred oscillator is a digital function generator/counter capable of producing sine, square, triangle, pulse and ramp wave forms. The unit has an adjustable frequency range from 0.1 hertz to 2.3 megahertz in seven ranges. It has a variable output amplitude from 5 mv to 20 Vp-p, variable symmetry/duty cycle from 5% to 95% in the ramp or pulse mode, continuous or externally controlled outputs. A d.c. offset between –10 v to +10 v can be added to any of the output wave forms.

The wave generated by the oscillator is amplified by a continuous wave power amplifier 66. The preferred amplifier is a solid state amplifier with a flat frequency response from 100 kilohertz to 5 megahertz. It provides 50 watts of linear power with low harmonic and intermodulation distortion. The amplified signal 68 from the amplifier is split and used to drive the six transducers.

When the transducers are vibrated at their resonance frequency, they are positively displaced. The movement of each transducer creates a high frequency sound wave. Because the transducers are cup-shaped, the output of each is focussed to a point. The useful range of frequencies in generating an aerosol are from 0.025 to 2.3 megahertz.

While the choice of transducer will determine the resonance frequency at which the oscillator will be set, a variable frequency oscillator is useful for allowing fine tuning of the aerosol generator, as well as the substitution of different transducers in different applications.

When the longitudinal sound waves generated by the transducers impinge a boundary between two materials having different sound velocities, such as the liquid-air interface in the primary reservoir, a shear wave is generated. The transducers are focused so that the shear wave is approximately at the liquid level of the primary reservoir so as to shear off a portion of the liquid and form tiny droplets of the liquid as an aerosol. While the tiny droplets act similar to a gas in their flow properties, they maintain the physical properties of a liquid.

Referring back to FIG. 2, it is preferred that the overflow reservoir include a heating element 72 for heating the capture liquid before generating the aerosol. The heating element is located below the overflow reservoir. A thermocouple is located in the primary reservoir and a temperature controller is provided to allow the temperature of the capture liquid to be set. By adjusting the temperature of the capture liquid, the properties of the aerosol to be generated can be varied. For example, if the liquid is maintained at a temperature 10 to 15 degrees Fahrenheit higher than the temperature of the process area, the resulting aerosol will tend to fill the process area from the top downward. Conversely, if the liquid is maintained at a temperature 10 to 15 degrees Fahrenheit lower than the temperature of the process area, the process area will tend to fill from the bottom upward. Depending on the ventilation and air flow paths of the particular process area, such flexibility can be useful.

The aerosol droplets formed by the transducers are transported from the pressurization chamber by the use of pressurized air. A pressurization fan 76 located at a pressurization chamber inlet builds the pressure within the pressurization chamber such that the aerosol can be carried by the air into a collection funnel 78, through a discharge chimney 82 and out a pressurization chamber outlet 84. The pressurization fan is preferably a variable speed d.c. powered fan with an adjustable flow rate of between 2 and 20 cubic feet per minute. The pressure maintained in the pressurization chamber should be high enough to cause flow of aerosol into the process area without stirring up the hazardous dust contained in the process area. The aerosol stream from the pressurization chamber outlet port is directed to the process area by the use of a flexible conduit connected to an existing ventilation system.

The aerosol generator cabinet also includes four adjustable feet 86 for leveling the primary reservoir. Each foot is attached to a threaded stud with a knurled head. Each stud mates with the threads of a threaded aperture on the cabinet frame such that the feet can be individually adjusted by turning the knurled heads. A bubble level can also be provided on the transducer mounting plate to assist in levelling the cabinet. It is important that the reservoirs be perfectly level so that the transducers are properly focused.

The cabinet includes a control panel 92 which allows the adjustment of the oscillator frequency, the power amplifier output, the temperature of the capture liquid and the speeds of the pressurization fan and recirculation pump. Displays for transducer output, oscillator frequency, reservoir temperature, recirculation pump rate, power amplifier output, and pressurization fan flow rate are also included. The control panel is preferably cooled with a 45 cubic foot per minute a.c. powered cooling fan.

In order to simplify clean up, the cabinet for the aerosol generator includes a pair of hinged side doors. Removable rear and lower front panels also provide easy access to the pressurization chamber. The pressurization chamber is mounted in the cabinet on a track which allows it to be slid out for maintenance and cleaning. A pair of threaded studs lock the pressurization chamber in position along the track during operation. The pressurization chamber also includes a removable top section to further simplify cleaning.

In order to clean the pressurization chamber, the cabinet is opened, then the primary and overflow reservoirs are drained of any excess liquid through drain openings. The pressurization chamber is unlocked and slid out along the track and the top is removed. The surfaces of the funnel and chimney are wiped with a cloth and the reservoirs are rinsed with a suitable cleaning solution depending on the capture liquid used. The surfaces of the reservoirs and pressurization chamber are then wiped with a clean cloth. The tubing for the liquid recirculation can be either cleaned or discarded.

Because the aerosol is generated by ultrasonic waves rather than by mechanical nozzles or other conventional methods for generating an aerosol, there is very little turbulence generated. Therefore, the resulting aerosol can be used to gently fill the process area without resuspending a significant portion of the contaminants. Most of the contaminants remain on the surfaces of the process area where they can be encapsulated by the capture liquid. The aerosol droplets encapsulate the particulates by colliding with the surfaces of the process area to form a thin film. Only a small amount, if any, if the hazardous material is caused to become resuspended by the aerosol stream. In order to further prevent the particulates from becoming resuspended, low aerosol stream rates are desired. Preferred flow rates are between 2 and 20 cubic feet per minute. By maintaining low flow rates, streaking or puddling of the encapsulant on the surfaces of the process area is avoided.

One important advantage of the aerosol generator of the present invention is that by properly selecting the transducers and the capture liquid, and by properly controlling the various operating parameters, an aerosol of a fairly uniform droplet size can be produced. Moreover, the size of the aerosol droplets can also be controlled.

In general, small aerosol droplets are preferred. The droplets should be small enough to behave like a gas in that they flow from areas of high concentration to areas of low concentration without condensing. The size of the droplets can be controlled by selection of the transducer and capture liquid. Generally, the higher the resonance frequency of a transducer, the smaller the aerosol droplet. For the preferred transducer described above as having a resonance frequency of about 2300 kilohertz, 95% of the aerosol droplets will be in the range of 0.3 to 5 microns for distilled water with a mean droplet diameter of about 2 microns. For the capture liquid, higher frequency is required to produce aerosol droplets of a smaller mean droplet size. If larger aerosol droplets are produced, higher aerosol stream flow rates are generally required.

In general, low aerosol stream flow rates are desired so as to minimize turbulence in the process area. However, the physical properties of the particular capture liquid used can affect the flow rate. The viscosity and surface tension are the properties that can most affect the flow rate. Changes in these properties can also have an impact on the power requirements, and hence, the efficiency of the process. For highly viscous capture liquids, the efficiency decreases and higher flow rates are required. As surface tension of the capture liquid increases, the efficiency of the aerosol generation increases. However, the efficiency curve generally includes a critical point after which further increases in surface tension can decrease the efficiency of aerosol generation. The temperature of the capture liquid can also affect the flow rate and efficiency due to its affects on the surface tension of a capture liquid. Surface tension generally decreases as temperature rises. Therefore, in addition to using the capture liquid heater to vary the temperature of the aerosol generated, it can be used to vary the surface tension and thereby vary the aerosol generator efficiency.

Other factors can also affect the flow rates required for the aerosol stream. An increase in the temperature of the process area will result in lower flow requirements. Conversely, increases in the humidity of the process area can require increased flow rates. The properties of the materials to be coated within the process area can also impact the flow rates. A higher coefficient of friction allows increased flow rates. Furthermore, if the process area is a great distance from the aerosol generator or at a higher elevation than the aerosol generator, higher flow rates may be required. Finally, if multiple coats of encapsulant are to be applied, higher flow rates may be required.

While the focus point for the transducers is generally at the capture liquid level of the primary reservoir, the precise level to which the transducers should be submerged in the capture liquid can vary. The precise depth to which the transducers should be adjusted is determined by the chemistry and temperature of the capture liquid, and the power and frequency applied to the transducers. Variations of 1 to 2 mils can have an impact on the efficiency of the aerosol generator. Fine tuning of the precise depth of the transducers can be achieved by adjusting the depth while visually checking the characteristics of the aerosol generated. The depth should be adjusted so that a dense fog of aerosol is produced. The need for fine tuning of the transducer depth may also be due to the effects that the transducers have on the surface of the capture liquid when operating. For the transducers described above, a cone-shaped node approximately ¼ inch in height forms above each transducer. The aerosol is produced from the tips and sides of the nodes.

Figure 4:
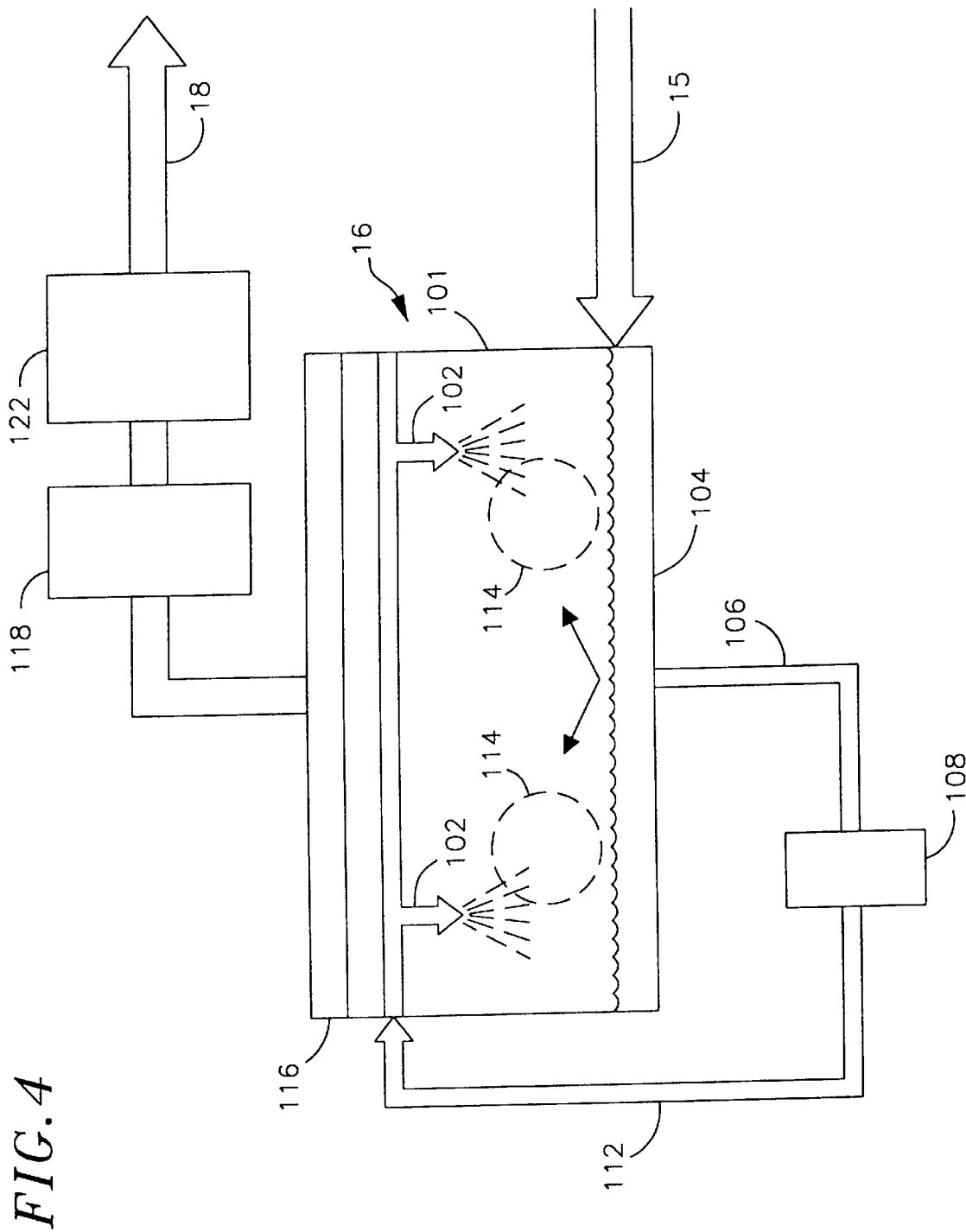
FIG. 4 is a partly schematic elevation view of a recovery chamber according to the present invention.

An optional aerosol recovery system of the present invention is illustrated in FIG. 4. In using such a recovery system, an exhaust aerosol stream is withdrawn from the process area through a flexible duct. The exhaust stream then enters the lower portion of a recovery chamber 101. The recovery chamber includes a plurality of spray nozzles 102 which are used to expose the exhaust to a spray bath. The spray generated by the nozzles is used to form a spray to both saturate the exhaust and cause the droplets to increase in size. As the droplets increase in size, they start to condense and fall to the bottom of the recovery chamber. Preferably distilled water is used for the spray though solvent based solutions may also be used so as to be compatible with the capture liquid selected.

The condensed liquid collects in a sump 104 in the recovery chamber and flows to a suction tube 106 of a peristaltic spray recirculating pump 108. The spray recirculating pump discharge is recycled through a recycle tube to the spray nozzles to produce additional spray. The preferred flow rate is about one gallon per minute, although this can be varied depending on the aerosol to be recovered.

Preferably the initial volume of spray liquid is measured so that the increase in volume and, therefore, the amount of aerosol recovered can be calculated. The difference between the increase in the volume of liquid in the recovery system and the decrease in volume in the aerosol generator allows for a mass balance calculation in which the total amount of capture liquid can be calculated.

The preferred recovery chamber includes a cabinet with a hinged top and removable side and back panels for access. A disposable glove bag liner with a capacity of about 16 cubic feet is used to line the cabinet. The glove ports 114 in the liner are useful for adjusting the nozzles. Preferably, the nozzles and recycle tubing are also disposable to simplify clean up. Because the peristaltic pump does not contact the spray, it need not be cleaned. However, as with the recirculation pump of the aerosol generator, an inexpensive disposable spray recirculation pump is contemplated to eliminate the cost associated with a peristaltic pump.

After the exhaust stream flows through the spray nozzles of the recovery chamber for aerosol removal, it proceeds to a moisture separator 116 where most of the entrained liquid will be removed. The preferred moisture separator is a disposable, lightweight stainless steel mesh filter.

From the moisture separator, the flow proceeds to a high-efficiency particulate air filter 118 in which approximately 99.7% of particulate 0.3 microns in diameter and larger are removed. Preferably, the filter is disposable.

Disposable materials are preferred for the recovery system since some of the hazardous material from the process area may be carried from the process area by the aerosol. Such hazardous material will generally be at least partially encapsulated by the aerosol and will be collected by the spray bath, the moisture separator or the filter.

An exhaust fan 122 is used to maintain the recovery chamber at a slight negative pressure and to assist in drawing exhaust through the recovery system. Preferably a variable speed d.c. fan is used so that the flow rate of gas through the recovery system can be adjusted. The preferred range for the exhaust fan is between about 4 and 25 cubic feet per minute. A differential pressure indicator can also be used to monitor the pressure differential between the aerosol generator and the recovery system so as to maintain the desired flow of aerosol through the system. A preferred pressure differential between the aerosol generator and recovery system is about 0.5 inches of water or less. In order to maintain flow through the system in the correct direction, the exhaust fan is generally run at a slightly higher flow rate than the pressurization fan.

The aerosol recovery system also includes a control panel for monitoring and controlling the spray flow and the exhaust flow. The liquid level in the sump can be visually inspected to calculate the volume of aerosol recovered. The nozzle spray pattern can also be visually inspected and adjusted manually through the glove ports.

In practice, the aerosol generator is first started so as to fill the process area with a fog of aerosol. An aerosol rate of about 1 liter per hour is generally adequate. Once the process area has been filled with this fog and an optimum concentration of aerosol in the process area has been reached, the aerosol recovery system is then started to allow the simultaneous feeding and purging of the process area. By maintaining a flow of aerosol through the system, the surfaces of the process area will be evenly coated with the encapsulant.

While flexible ducts are generally described for connecting the aerosol generator and aerosol recovery system to the process area, hard ducts may also be used and are preferred in systems that will operate for prolonged periods. Moreover, various other modifications to the presently described invention would be apparent to one skilled in the art and are intended to be included within the scope of this invention. For example, while air is generally described for use as the carrier gas for carrying the aerosol into the process area; other gases may also be used. An inert gas such as nitrogen may be useful as a carrier gas, especially if a flammable capture liquid is used. By maintaining an inert atmosphere, the risk of explosion can be reduced. If nitrogen or some other gas is used as the carrier gas, it can be provided in pressurized cylinders and the pressurization fan can be replaced by a pressure regulator.

The process and apparatus will be described further by the following examples.

EXAMPLE 1

A test booth was constructed measuring eight feet long by four feet deep by eight feet high for a total volume of 256 cubic feet. Various test coupons were placed within the booth. The test coupons included samples of stainless steel plate, carbon steel piping, carbon steel valves, glass, plastic, painted drywall, wood and wire insulation. Certain of the test coupons were covered with a conventional strippable coating. The booth, including the test coupons, was then dusted with a fine, highly mobile dust of fluorescent powder to simulate contamination of a process area with hazardous particulates. The individual dust particles ranged in size from about 1 to about 100 microns in diameter with a mean particle diameter of about 40 microns. A contamination survey using standard disc smears quantified that 60 to 80% of the smear surface was covered with the powder.

The booth was closed and the discharge of an aerosol generator of the present invention was connected to an opening on the lower third of the test booth door. A total of 1000 milliliters of capture coating was introduced to the test booth as an aerosol through a four-inch filtered airway. The flow rate of the aerosol was controlled to a rate of less than ten cubic feet per minute through an injection nozzle with a nominal diameter of six inches. The total discharge time was approximately four hours.

During the test, the temperature and humidity of the test booth were measured and compared to the ambient atmosphere. The initial temperature of 76° F. and humidity of 40k for the test booth matched the measurements for the ambient atmosphere. The temperature and humidity of the ambient atmosphere did not change during the test. While the temperature of the test booth did not change during the test, the humidity increased to over 99%.

The capture coating used for generating the aerosol was a sugar mixture comprising 2 parts by weight polysaccharide, 18 parts by weight monosaccharide and 80 parts by weight deionized water.

About one hour after stopping the generation of aerosol, the test booth was entered for visual inspection. Inspection with a black light revealed the fluorescent glow of the simulated contamination under and within the capture coat which had deposited on all interior surfaces of the test booth including the test coupons. A survey using standard disc smears indicated that insignificant levels of fluorescent powder remained airborne in the test booth. The surfaces of the test booth and the test coupons were fairly evenly covered with a thin, viscous layer of capture coating about 3 mils thick.

Additionally, gentle rubbing of the coated surfaces while observing the fluorescent powder under a black light revealed that the fluorescent powder was captured or "stuck" in place. Subsequent testing of the test coupons up to a year after the application of the capture coating revealed that the fluorescent powder was still-captured or "stuck."

EXAMPLE 2

A capture liquid useful for many different hazardous materials can be produced as follows:

| WEIGHT | MATERIAL |
|---|---|
| PART A | |
| 3.95 | 1-methyl-2-pyrrolidinone |
| 0.71 | triethyl amine |
| 0.06 | ammonium hydroxide |
| 2.71 | dipropylene glycol methyl ether |
| 1.35 | texanol ester alcohol |
| 0.02 | silicone glycol |
| 0.23 | isopropyl alcohol |
| 0.69 | butyl benzyl phthalate |
| 0.08 | ammonium benzoate |
| 8.78 | polyurethane dispersion |
| 16.20 | acrylic copolymer |
| 40.22 | water |
| 75.00 | TOTAL |
| PART B | |
| 5.00 | aliphatic polyisocyanate |
| 0.13 | hexamethylene diisocyanate (HDI) |
| 19.87 | HDI based polyisocyanate |
| 25.00 | TOTAL |

The polyurethane dispersion and acrylic copolymer used in this example were products manufactured by Imperial Chemicals Limited and sold under the names Neorez R-9679 and Neocryl A-5045, respectively.

Part A and Part B are combined in the weight ratio of 3:1 to form a capture liquid. Upon collision with the hazardous dust and the surfaces of the process area to be treated, the aerosol formed by this capture liquid begins to coalesce to form a tacky layer that can encapsulate the hazardous dust.

What is claimed is:

1. An apparatus for generating an aerosol encapsulant from capture liquid comprising:
    a chamber having an outlet port;
    a primary reservoir in the chamber for containing the capture liquid, the primary reservoir having a liquid level;
    a primary reservoir level controller comprising:
        an overflow reservoir having a liquid level lower than the liquid level of the primary reservoir;
        a liquid recirculation pump for transferring the capture liquid from the overflow reservoir to the primary reservoir; and
        an overflow weir for allowing the capture liquid to spill over from the primary reservoir to the overflow reservoir, thereby maintaining the liquid level of the primary reservoir at an essentially constant level;
    at least one transducer submerged in the liquid;
    motive means for causing a flow of a carrier gas to carry the aerosol from the chamber through the outlet port; and
    a transducer height adjuster.

2. The apparatus of claim 1 wherein the carrier gas is ambient air and the motive means comprises a fan.

3. An apparatus for generating an aerosol encapsulant from a capture liquid comprising:
    a chamber having an outlet port;
    a primary reservoir in the chamber for containing the capture liquid, the primary reservoir having a liquid level;
    a primary reservoir level controller comprising;
        an overflow reservoir having a liquid level lower than the liquid level of the primary reservoir;
        a liquid recirculation pump for transferring the capture liquid from the overflow reservoir to the primary reservoir; and
        an overflow weir for allowing the capture liquid to spill over from the primary reservoir to the overflow reservoir, thereby maintaining the liquid level of the primary reservoir at
    an essentially constant level;
    at least one transducer submerged in the liquid;
    motive means for causing a flow of a carrier gas to carry the aerosol from the chamber through the outlet port; and
    an aerosol recovery system including a filter for recovering a portion of the aerosol from an exhaust stream.

4. The apparatus of claim 3 wherein the aerosol recovery system further comprises a spray bath for capturing a portion of the aerosol from the exhaust stream.

5. The apparatus of claim 4 wherein the spray bath comprises a sump for containing a spray liquid, a nozzle for producing a spray, and a spray liquid recirculation pump for recirculating the liquid from the sump to the nozzle.

6. The apparatus of claim 3 wherein the aerosol recovery system further comprises an exhaust fan.

7. An apparatus for generating an aerosol encapsulant from a capture liquid comprising:
    a chamber having an outlet port;
    a primary reservoir in the chamber for containing the capture liquid, the primary reservoir having a liquid level;
    a primary reservoir level controller comprising:
        an overflow reservoir having a liquid level lower than the liquid level of the primary reservoir;
        a liquid recirculation pump for transferring the capture liquid from the overflow reservoir to the primary reservoir; and
        an overflow weir for allowing the capture liquid to spill over from the primary reservoir to the overflow reservoir, thereby maintaining the liquid level of the primary reservoir at an essentially constant level;
    six transducers arranged to point in a direction generally perpendicular to the liquid level of the primary reservoir; and
    motive means for causing a flow of a carrier gas to carry the aerosol from the chamber through the outlet port.

8. An apparatus for generating an aerosol encapsulant from a capture liquid for introduction into a process area, the apparatus comprising:
    a chamber having an outlet port;
    a primary reservoir in the chamber for containing the capture liquid, the primary reservoir having a liquid level;
    a primary reservoir level controller comprising:
        an overflow reservoir having a liquid level lower than the liquid level of the primary reservoir;
        a liquid recirculation pump for transferring the capture liquid from the overflow reservoir to the primary reservoir; and
        an overflow weir for allowing the capture liquid to spill over from the primary reservoir to the overflow reservoir, thereby maintaining the liquid level of the primary reservoir at an essentially constant level;
    at least one transducer submerged in the liquid;

a fan adapted to cause a flow of a carrier gas to carry the aerosol from the chamber through the outlet port and into the process area; and an aerosol recovery system including a filter for recovering the aerosol from an exhaust aerosol stream drawn from the process area.

9. The apparatus of claim 8 wherein the aerosol recovery system further comprises a spray bath for capturing the exhaust aerosol from the exhaust aerosol stream and producing an exhaust gas stream.

10. The apparatus of claim 8 wherein the process area is a remote process area, the apparatus further comprising a conduit for introducing the aerosol into the remote process area.

11. The apparatus of claim 10 wherein the conduit is a first conduit, the apparatus further comprising a second conduit for drawing the exhaust aerosol stream from the process area to the aerosol recovery system.

12. The apparatus of claim 8 wherein the aerosol recovery system further comprises a sump for containing a spray liquid, a nozzle for producing a spray, and a spray liquid recirculation pump for recirculating the liquid from the sump to the nozzle.

13. The apparatus of claim 8 wherein the aerosol recovery system further comprises an exhaust fan.

14. An apparatus for generating an aerosol encapsulant from a capture liquid for introduction into a process area, the apparatus comprising:

a chamber having an outlet port;

a primary reservoir in the chamber for containing the capture liquid, the primary reservoir having a liquid level;

a primary reservoir level controller comprising:

an overflow reservoir having a liquid level lower than the liquid level of the primary reservoir, a liquid recirculation pump for transferring the capture liquid from the overflow reservoir to the primary reservoir; and an overflow weir for allowing the capture liquid to spill over from the primary reservoir to the overflow reservoir, thereby maintaining the liquid level of the primary reservoir at an essentially constant level;

six transducers arranged to point in a direction generally perpendicular to the liquid level of the primary reservoir;

a fan adapted to cause a flow of a carrier gas to carry the aerosol from the chamber through the outlet port and into the process area; and an aerosol recovery system for recovering the aerosol from an exhaust aerosol stream drawn from the process area.

15. An apparatus for generating an aerosol encapsulant from a capture liquid for introduction into a process area, the apparatus comprising:

a chamber having an outlet port, a primary reservoir in the chamber for containing the capture liquid, the primary reservoir having a liquid level;

a primary reservoir level controller;

at least one transducer submerged in the liquid;

a transducer height adjuster; and a fan adapted to cause a flow of a carrier gas to carry the aerosol from the chamber through the outlet port and into the process area.

* * * * *